No. 742,644. PATENTED OCT. 27, 1903.
T. J. HART.
TUBE CLEANER.
APPLICATION FILED DEC. 19, 1900.
NO MODEL
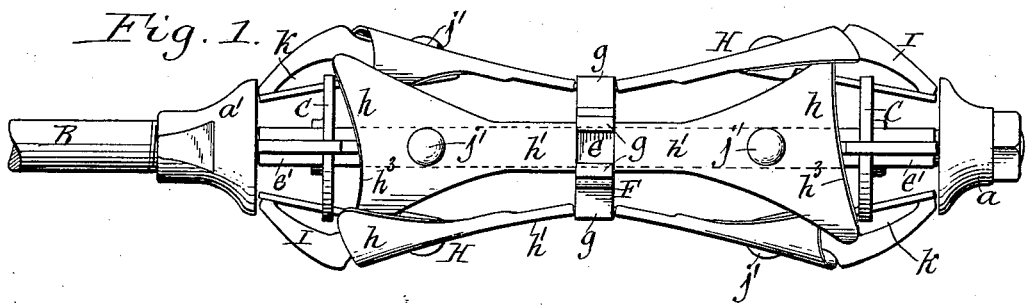
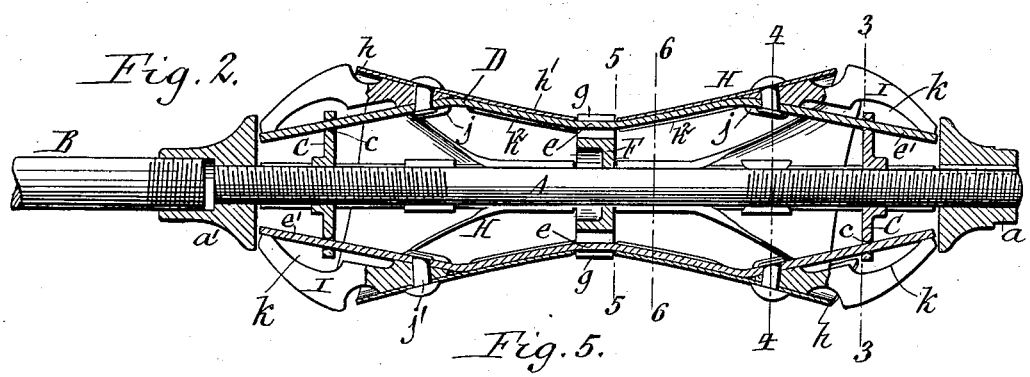
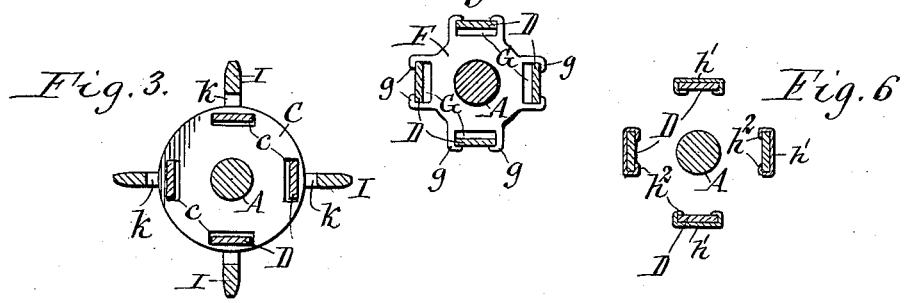
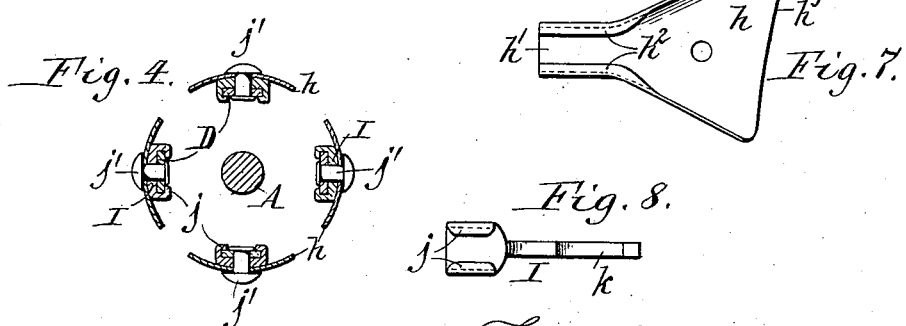
Witnesses:
E. A. Volk
F. F. Scherzinger
Thomas J. Hart, Inventor.
By Wilhelm Bonner, Attorneys.

No. 742,644.

Patented October 27, 1903.

UNITED STATES PATENT OFFICE.

THOMAS J. HART, OF BUFFALO, NEW YORK, ASSIGNOR TO SHERWOOD MANUFACTURING COMPANY, OF BUFFALO, NEW YORK.

TUBE-CLEANER.

SPECIFICATION forming part of Letters Patent No. 742,644, dated October 27, 1903.

Application filed December 19, 1900. Serial No. 40,353. (No model.)

*To all whom it may concern:*

Be it known that I, THOMAS J. HART, a citizen of the United States, residing at Buffalo, in the county of Erie and State of New York, have invented new and useful Improvements in Tube-Cleaners, of which the following is a specification.

This invention relates to that class of tube-cleaners in which the scrapers are carried by spring-bars which are capable of radial adjustment on a supporting-spindle for adapting the cleaner to tubes of different diameters.

The object of this invention is to provide a tube-cleaner of this character which is simple and durable in construction and efficient in operation and which can be manufactured at reduced cost.

In the accompanying drawings, Figure 1 is a side view of my improved tube-cleaner. Fig. 2 is a longitudinal section thereof. Figs. 3, 4, 5, and 6 are cross-sections taken in lines 3 3, 4 4, 5 5, and 6 6, respectively. Fig. 7 is an inside view of one of the scrapers. Fig. 8 is an inside view of one of the scraper-guards.

Like letters of reference refer to like parts in the several figures.

A represents the adjusting rod or spindle of the tube-cleaner, which is provided at opposite ends with right and left hand screw-threads and with screw nuts or heads $a$ $a'$. The screw nut or head $a'$ at the rear end of the spindle is connected with the end of the handle B, whereby the tube-cleaner is operated.

C C represent the internally-screw-threaded disks or followers, which work on the threads of the spindle and each of which is provided with a number of openings $c$, which are arranged near its edge.

D represents the longitudinal flexible bars or springs which carry the scraping devices and each of which is bulged outwardly near opposite ends, so as to form an inwardly-deflected part $e$ on the bar between the bulges and inwardly-inclined parts $e'$, extending from the bulges to the ends of the bar. The several spring-bars are arranged circumferentially around the spindle and the inclined ends of the bars are arranged in the openings of the followers.

F represents a supporting-collar whereby the inwardly-deflected central parts of the spring-bars are supported on the spindle. This collar is mounted on the spindle between the threaded portions thereof and is provided on its outer side with a number of sockets G, each of which receives the central part of one of the spring-bars. Each of these sockets is formed by two hooks $g$, which project outwardly from the collar and face each other. Before attaching the spring-bars to the collar the hooks of each socket are spread apart to permit of inserting the spring-bars flatwise between the hooks. After each spring-bar has been thus placed between the socket-hooks the latter are pressed together by a cold-shut, so that the hooks overhang the outer side of the spring-bar and confine the same in the socket. The sockets G of the collar F are preferably deeper than the thickness of the spring-bars, as shown in Figs. 2 and 5, whereby the bars are permitted to recede or contract radially inward upon striking an obstruction. This means of connecting the central parts of the spring-bars with the spindle is very simple and inexpensive and securely holds the bars in place.

H represents the scrapers or cutters whereby the incrustations are removed from the inner side of the tubes and which are mounted on the outer side of the spring-bars. Each of these scrapers is formed of sheet metal in substantially triangular shape and consists of a blade $h$ and an attaching-shank $h'$, projecting inwardly from the blade. The scraper is arranged with its shank on one side of the depressed part $e$ of a spring-bar, so that its blade projects outwardly over the adjacent inclined outer end of the spring-bar. The shank of the scraper is secured to the spring-bar by means of longitudinal flanges $h^2$, arranged on opposite sides of the shank and bent downwardly and inwardly against the under side of the spring-bar. The two scrapers which are secured to the depressed central part of a spring-bar abut with their inner ends against opposite sides of the hooks forming the socket on the supporting-collar in which the spring-bar is seated, thereby holding the spring-bar against lengthwise displacement on the collar.

The outer or front edge $h^3$ of the blade of each scraper is preferably formed obliquely in a circumferential direction, so that the scraper has a shearing action when moved through the tube to be cleaned.

I represents guides or guards of cast metal whereby the tube-cleaner is guided, so that its blades do not strike the outer edge of the tube or other obstruction upon moving the scraper into and out of the tube to be cleaned. These guides are arranged lengthwise on the outer inclined ends of the guide-bars and are placed with their inner ends between the overhanging blades of the scrapers and the spring-bars. Each of the guides is secured at its inner end to its spring-bar by means of lips $j$, arranged on opposite sides of the guide and bent against the under side of the bar. The scraper and guide at each end of a spring-bar are held in their proper relative position on the bar by a rivet $j'$ or other fastening passing through the scraper, guide, and spring-bar. The under side of each guide is notched or recessed, as shown at $k$, whereby the guide straddles the adjacent follower and permits the latter to move lengthwise on the spring-bar. The outer side of the guide is curved from the edge of the scraper-blade inwardly toward the outer end of the spring-bar, whereby the several guides at the same end of the cleaner together form a forwardly or outwardly tapering conical guide which protects the scraper-blades and guides the cleaner past obstructions.

Upon turning the spindle relatively to the spring-bars the followers are moved lengthwise on the spindle toward and from each other, owing to the screw connection between the follower and spindle, and the bars, together with the scrapers and guides mounted thereon, are moved radially in or out by reason of the followers working on the inclined ends of the spring-bars, thereby expanding or contracting the tube-cleaner in a manner well known in this type of tube-cleaners.

By constructing the scraper-blades of sheet metal and the guides of cast metal in this manner the cost of producing the tube-cleaner is reduced, while its durability is increased.

I claim as my invention—

1. The combination of a spindle having right and left hand screw-threads, followers working on said threads, a supporting-collar surrounding the central portion of said spindle, spring-bars arranged lengthwise of said spindle and having inbent central portions seated in sockets in said collar and having inclined end portions slidably connected with said followers, and scrapers secured lengthwise to said spring-bars and having outwardly-directed scraping ends adjacent to the inclined end portions of said spring-bars and having portions abutting against said supporting-collar, substantially as set forth.

2. The combination with the spindle provided with right and left hand screw-threads, and the followers working on said threads, of spring-bars arranged lengthwise of the spindle and each having a depressed central part and inclined ends slidably connected to the followers, scrapers secured to the depressed central part of the spring-bars and overhanging the inclined ends thereof, and guides arranged between the inclined ends of the spring-bars and the overhanging parts of the scrapers, substantially as set forth.

3. The combination with the spindle provided with right and left hand screw-threads, and the followers working on said threads, of spring-bars arranged lengthwise of the spindle and having inclined ends slidably connected to the followers, scrapers secured to the central part of the bars, and guides secured to the inclined part of the bars, each guide having a recess on its inner side whereby it straddles the adjacent follower and permits the same to move lengthwise on the bar, substantially as set forth.

4. The combination with the spindle provided with right and left hand screw threads at opposite ends, and the followers working on said threads, of spring-bars arranged lengthwise of the spindle and each bar having two bulges forming a depression at the middle of the bar and inclines at the ends of the bar which engage with openings in the followers, scrapers arranged on the depressed parts thereof, flanges formed on the scrapers and engaging with the under side of the bars, guides arranged between the inclined parts of the bars and the overhanging parts of the scrapers, lips formed on the guides and engaging with the under side of the inclined ends of the bars, and rivets passing through the scrapers, guides and bars, substantially as set forth.

Witness my hand this 5th day of December, 1900.

THOMAS J. HART.

Witnesses:
  JNO. J. BONNER,
  CLAUDIA M. BENTLEY.